US011036420B2

(12) United States Patent
Thoppil et al.

(10) Patent No.: US 11,036,420 B2
(45) Date of Patent: Jun. 15, 2021

(54) OBJECT STORE MIRRORING AND RESYNC, DURING GARBAGE COLLECTION OPERATION, FIRST BUCKET (WITH DELETED FIRST OBJECT) WITH SECOND BUCKET

(71) Applicant: NetApp Inc., Sunnyvale, CA (US)

(72) Inventors: Anil Paul Thoppil, Pleasanton, CA (US); Cheryl Marie Thompson, Sunnyvale, CA (US); Qinghua Zheng, San Jose, CA (US); Jeevan Hunsur Eswara, Sunnyvale, CA (US); Nicholas Gerald Zehender, Santa Clara, CA (US); Ronak Girishbhai Ghadiya, Sunnyvale, CA (US); Sridevi Jantli, Vancouver (CA)

(73) Assignee: NetApp, Inc., Sunnyvale, CA (US)

( * ) Notice: Subject to any disclaimer, the term of this patent is extended or adjusted under 35 U.S.C. 154(b) by 111 days.

(21) Appl. No.: 16/389,019

(22) Filed: Apr. 19, 2019

(65) Prior Publication Data
US 2020/0327141 A1 Oct. 15, 2020

Related U.S. Application Data

(63) Continuation of application No. 16/382,344, filed on Apr. 12, 2019.

(51) Int. Cl.
*G06F 3/06* (2006.01)

(52) U.S. Cl.
CPC ............ *G06F 3/065* (2013.01); *G06F 3/0617* (2013.01); *G06F 3/0619* (2013.01); *G06F 3/0644* (2013.01); *G06F 3/0647* (2013.01); *G06F 3/0652* (2013.01); *G06F 3/0683* (2013.01); *G06F 3/0685* (2013.01)

(58) Field of Classification Search
CPC ...... G06F 3/0652; G06F 3/065; G06F 3/0617; G06F 3/0683
See application file for complete search history.

(56) References Cited

U.S. PATENT DOCUMENTS

| 7,584,338 | B1* | 9/2009 | Bricker ............... G06F 11/2097 711/162 |
| 7,640,409 | B1 | 12/2009 | Stafford et al. |
| 9,367,448 | B1* | 6/2016 | Botelho ............. G06F 12/0253 |
| 9,762,670 | B1 | 9/2017 | Grove et al. |
| 10,474,372 | B1 | 11/2019 | Olson et al. |
| 2006/0171523 | A1* | 8/2006 | Greenwell .......... H04L 67/1095 379/242 |
| 2009/0164780 | A1 | 6/2009 | Murayama et al. |

(Continued)

*Primary Examiner* — Reginald G Bragdon
*Assistant Examiner* — Chie Yew
(74) *Attorney, Agent, or Firm* — Cooper Legal Group, LLC

(57) ABSTRACT

Techniques are provided for object store mirroring. Data within a storage tier of a node may be determined as being data to tier out to a primary object store based upon a property of the data. A first object is generated to comprise the data. A second object is generated to comprise the data. The first object is transmitted to the primary data store for storage in parallel with the second object being transmitted to a mirror object store for storage. Tiering of the data is designated as successful once acknowledgements are received from both the primary object that the first object was stored and the mirror object store that the second object was stored.

20 Claims, 14 Drawing Sheets

(56) References Cited

U.S. PATENT DOCUMENTS

| | | | |
|---|---|---|---|
| 2010/0161688 A1* | 6/2010 | Kesselman | G06F 3/0619 |
| | | | 707/813 |
| 2010/0191702 A1* | 7/2010 | Hofmann | G06F 16/27 |
| | | | 707/616 |
| 2014/0115289 A1 | 4/2014 | Morishita et al. | |
| 2014/0122797 A1 | 5/2014 | Yadav et al. | |
| 2015/0324388 A1 | 11/2015 | Benke et al. | |
| 2016/0232059 A1* | 8/2016 | Khurange | G06F 16/1752 |
| 2016/0349993 A1 | 12/2016 | Udupi et al. | |
| 2017/0139615 A1 | 5/2017 | Olson et al. | |
| 2018/0081563 A1* | 3/2018 | Roberts | G11C 7/00 |
| 2018/0225052 A1 | 8/2018 | Rogers et al. | |
| 2019/0129616 A1 | 5/2019 | Nguyen et al. | |
| 2020/0057586 A1* | 2/2020 | Inoue | G06F 3/0614 |

\* cited by examiner

OBJECT STORE MIRRORING AND RESYNC, DURING GARBAGE COLLECTION OPERATION, FIRST BUCKET (WITH DELETED FIRST OBJECT) WITH SECOND BUCKET

RELATED APPLICATION

This application claims priority to and is a continuation of U.S. patent application Ser. No. 16/382,344, titled "OBJECT STORE MIRRORING" and filed on Apr. 12, 2019, which is incorporated herein by reference.

BACKGROUND

Many users store data within an object store, such as a cloud computing environment or other storage service hosted by a third party provider. In an example of storing and managing data, a user may utilize dedicated nodes, such as hardware and/or software (e.g., a storage virtual machine), to store and access data. A node may manage one or more tiers of storage. For example, the node may manage a performance storage tier within which frequently accessed data is stored. The node may comprise a capacity tier within which infrequently accessed data is stored. Storage devices within the capacity tier may be relatively cheaper but slower than storage devices within the performance tier.

The node may be configured to tier out (e.g., migrate, copy, relocate, etc.) certain data from a storage tier of the node to a remote object store. For example, infrequently accessed data (cold data) may be transmitted from the node to the remote object store as an object. This may be cost effective because storage provided by the remote object store may be cheaper and scalable, but slower (higher latency). Unfortunately, the remote object store may not provide adequate redundancy and availability for the objects stored from the storage tier to the remote object store since merely a single copy of each object is maintained within a single remote object store. Even when there are multiple copies of an object, the copies might be in the same availability zones from a disaster standpoint (e.g., a same building, a same room, or a same location/zone within which all nodes may be affected by a disaster). For example, if an on-premises object store is located in a lab, then multiple copies of an object may be stored on different nodes of the on-premises object store. While a user can still access a copy of the object if a node fails, the user cannot access any copies if the entire on-premises object store has a disaster, such as where the lab burns down. If the remote object store is inaccessible due to network issues, has a failure, loses an object, etc., then clients will be unable to access data within the objects stored within the remote object store.

DETAILED DESCRIPTION

Figure 1:
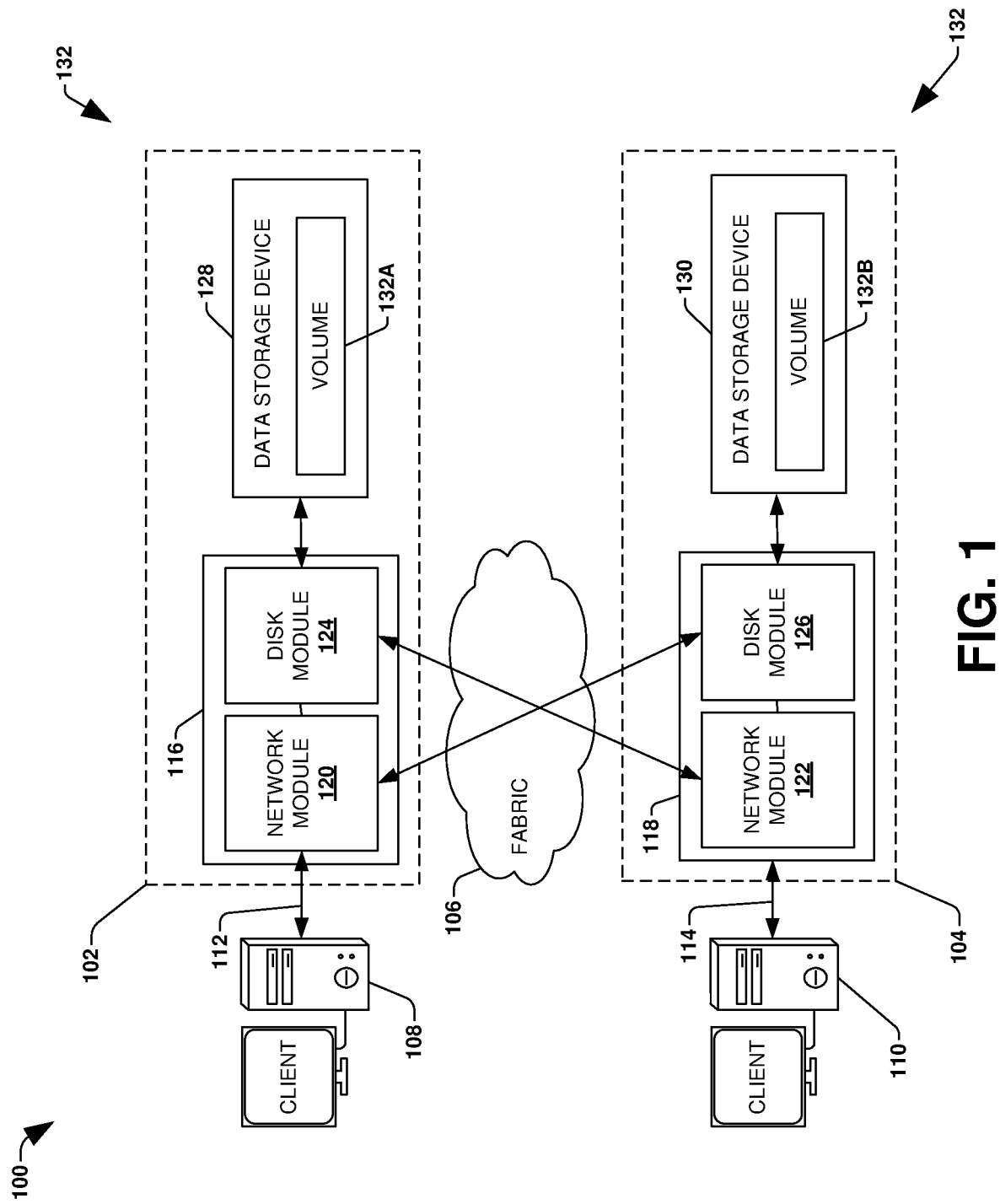
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A node, such as a computing device, a storage controller, a storage virtual machine, a storage service, or any other hardware or software or combination thereof, may store data within a storage tier. The storage tier may comprise dedicated storage device owned by the node (e.g., locally attached storage or storage accessible to the node over a network). The node may tier out certain data from the storage tier to a primary object store, such as infrequently accessed data. The data may be stored into objects (e.g., an object may comprise slots such as 1024 or any other number of slots into which data such as 4 kb or any other size of data may be stored) that are then transmitted by the node to the primary object store for storage.

As provided herein, additional redundancy and availability is provided by a component (e.g., hardware, software, or a combination thereof, such as a storage virtual machine, a storage service, a node, a computer, a controller, etc.) configured to mirror the objects of the primary object store to a mirror object store. In an example of a tiering operation, when an object is to be written to the primary object store, another object comprising the same data is created for transmission to the mirror object store. The object is transmitted to the primary object store in parallel with the other object being transmitted to the mirror object store. The tiering operation is not considered complete unless both the primary object store acknowledges the object as being stored and the mirror object store acknowledges the other object being stored and/or based upon both objects being validated as having valid data. In this way, the objects within the mirror object store are maintained as mirrored copies of the objects within the primary object store, thus improving redundancy and availability.

The component also allows users to switch and migrate between different object store providers. This may be accomplished by attaching a storage bucket of another provider to the component, synchronizing objects from the primary object store to the storage bucket, swapping from using the primary object store to using the storage bucket of the provider, and removing the objects from the primary object store.

The component also allows users to improve performance where the primary object store may limit operations to a storage bucket. If the throughput of writing objects to and/or reading objects from the storage bucket is below a threshold, then a new storage bucket of the primary object store can be attached to the component for tiering and/or mirroring data to the new storage bucket. In an example, some objects may be migrated from the storage bucket to the new storage bucket to improve throughput to those objects and the remaining objects within the storage bucket.

The component also allows users to swap from using a storage bucket to using a new storage bucket. For example, a user may assign a wrong name to the storage bucket during creation. Because the name may not be changed, the storage bucket will retain the wrong name. Accordingly, the component allows the user to create the new storage bucket, migrate objects from the storage bucket to the new storage bucket, and delete the storage bucket.

The component also provides for failover capabilities between objects stores and/or nodes. For example, a storage tier of the node may be mirrored (e.g., synchronous replication of operations or asynchronous replication of data) to a mirrored storage tier of another node so that client access to data can be failed over to the mirrored storage tier if the node fails. Similarly, the mirror object store is maintained as a mirror of the primary object store so that access to objects can be failed over to the mirrored object store if the primary object store encounters an issue (e.g., an object is lost, network access to the primary object store is lost, the primary object store has a failure, etc.).

In this way, the component allows storage buckets to be added and/or removed from various objects stores for tiering data from a storage tier of a node to the storage buckets. This improves redundancy and availability because multiple copies of the same object can be stored within multiple object stores.

To provide for object store mirroring, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that object store mirroring may be implemented within the clustered network environment 100. It may be appreciated that object store mirroring may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
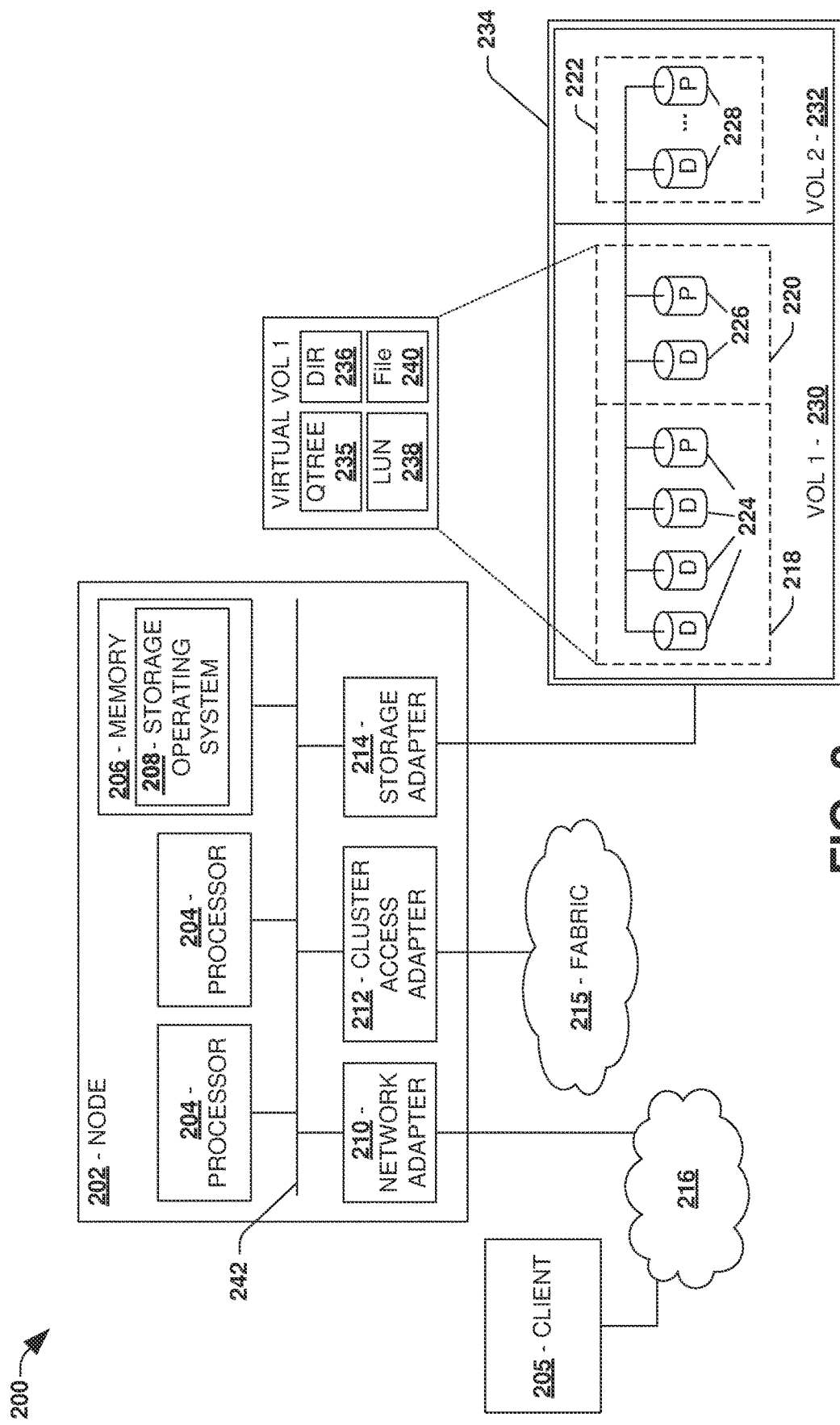
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that object store mirroring may be implemented for the data storage system 200. It may be appreciated that object store mirroring may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
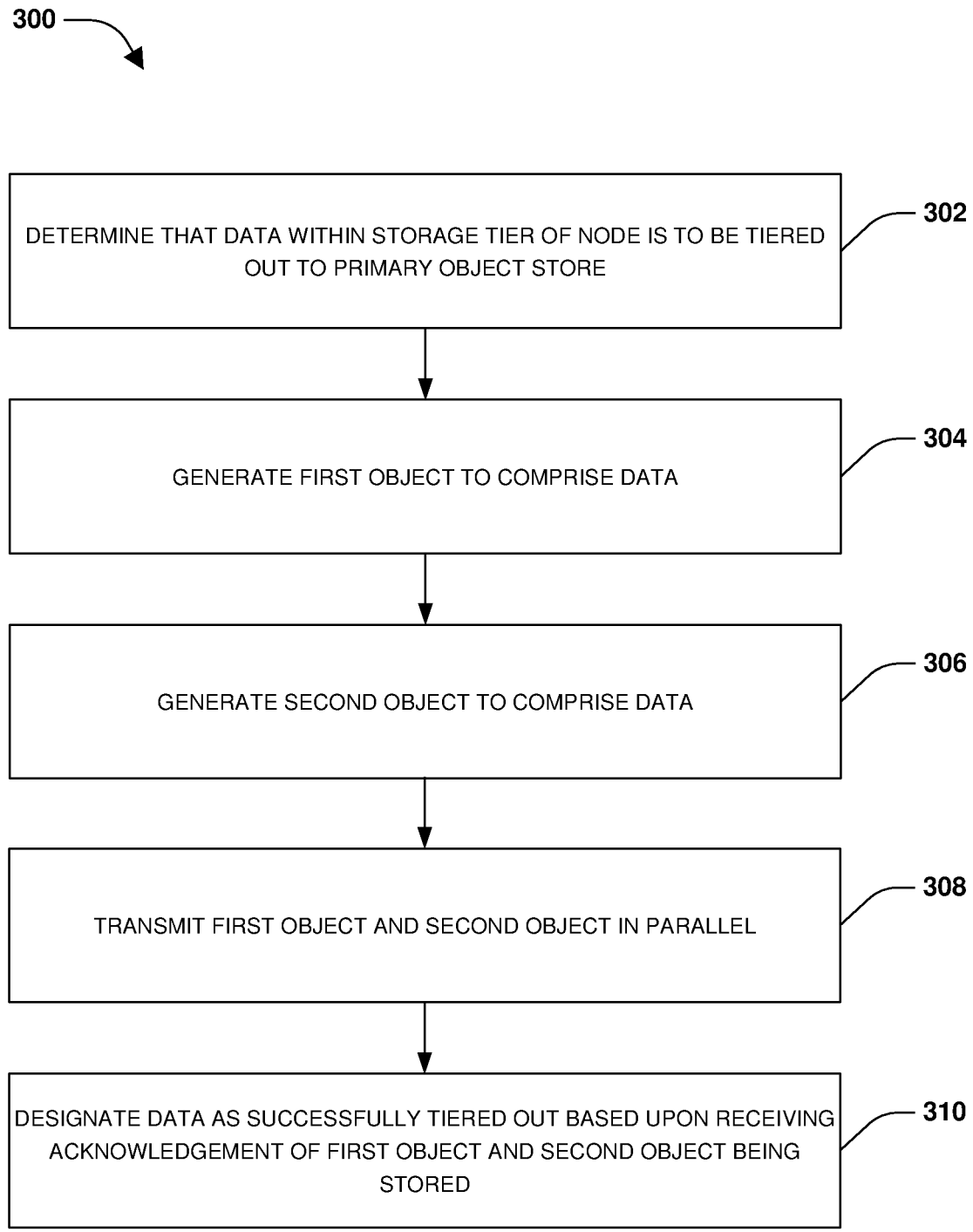
FIG. 3 is a flow chart illustrating an example method for object store mirroring.
Figure 4A:
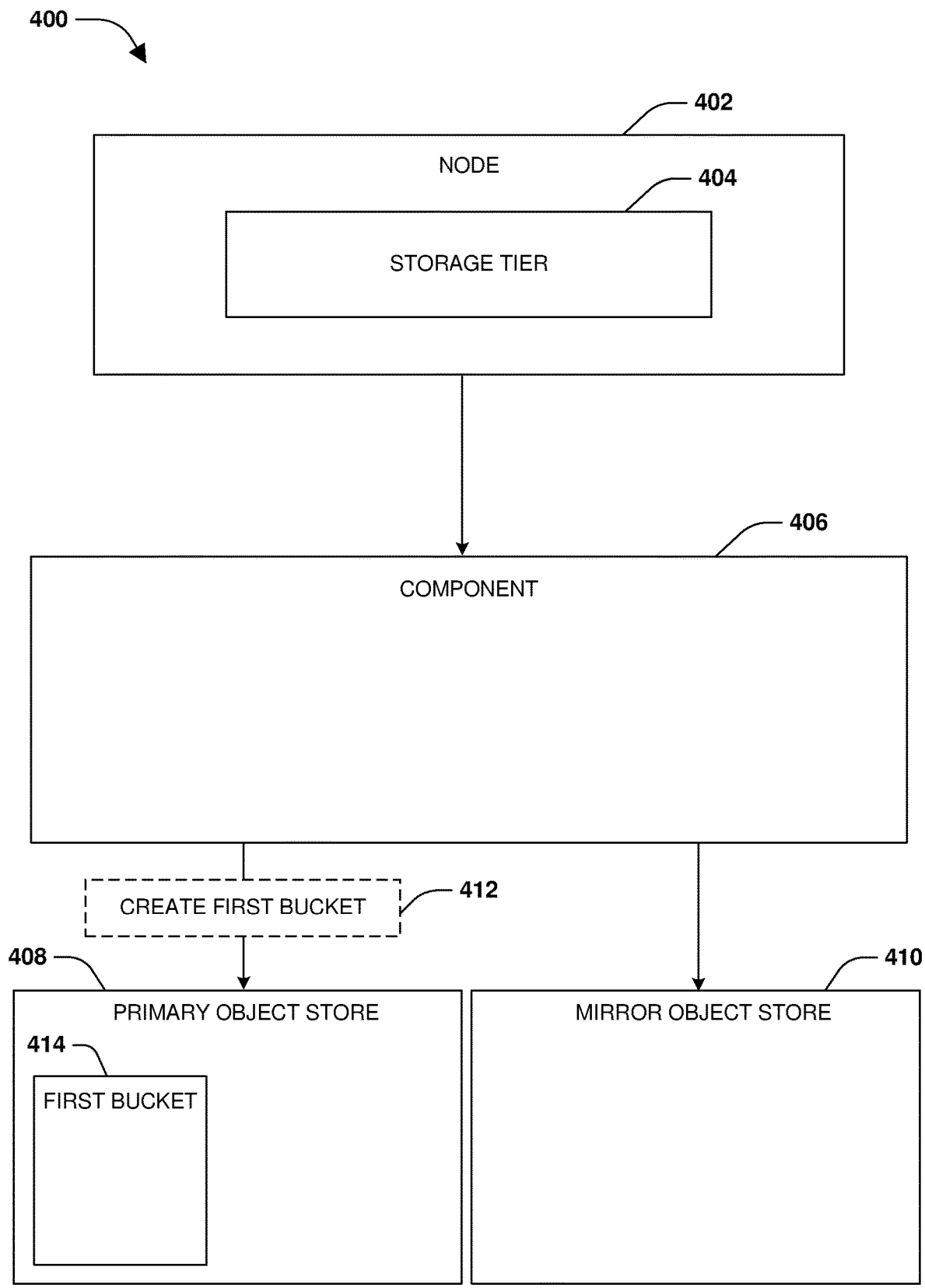
FIG. 4A is a component block diagram illustrating an example system for object store mirroring, where a first storage bucket is attached to a component.

One embodiment of object store mirroring is illustrated by an exemplary method 300 of FIG. 3 and further described in conjunction with system 400 of FIGS. 4A-4I. A node 402, such as a computer, a storage controller, a server, a storage virtual machine, a storage service, hardware, software, or a combination hardware and software, may be configured to provide client devices with access to data stored within one or more storage tiers (e.g., locally attached storage, storage accessible over a local network, etc.). For example, the node 402 may store frequently accessed data within a storage tier 404, as illustrated by FIG. 4A. In an example, the node 402 may be paired with a second node not illustrated. Data may be synchronously or asynchronously replicated from the storage tier 404 of the node 402 to storage managed by the second node, such as a mirror storage tier of the second node. Thus, if the node 402 fails, the second node can provide clients with access to replicated data within the storage of the second node. In this way, a failover operation can be performed to redirect access operations from the storage tier 404 to the storage of the second node.

Because the storage tier 404 of the node 402 may be relatively more expensive and less scalable than object storage provided by an object store (e.g., a cloud provider may provide low cost scalable cloud storage), it would be beneficial to tier off (e.g., migrate, relocate, etc.) certain types of data. Because the storage tier 404 may be faster than object storage, frequently accessed data (hot data) may be stored within the storage tier 404 so that client devices can quickly access such data through the node 402. Infrequently accessed data (cold data) may be tiered off from the storage tier 404 to the object storage.

Accordingly, a component 406 (e.g., a computer, a storage controller, a server, a storage virtual machine, a service, hardware, software, or a combination hardware and software) is configured to manage the tiering of data to one or more object stores. The component 406 may be implemented within the node 402, within a separate computing device, or within an object store. In an example, the component 406 may establish a connection with a primary object store 408 over a network. The primary object store 408 may be hosted by a third party provider such as a cloud service provider. The component 406 may create 412 a first storage bucket 414 within the primary object store 408. The first storage bucket 414 may correspond to a logical designation of storage by the primary object store 408 that can be used to by the component 406 to store objects.

Figure 4B:
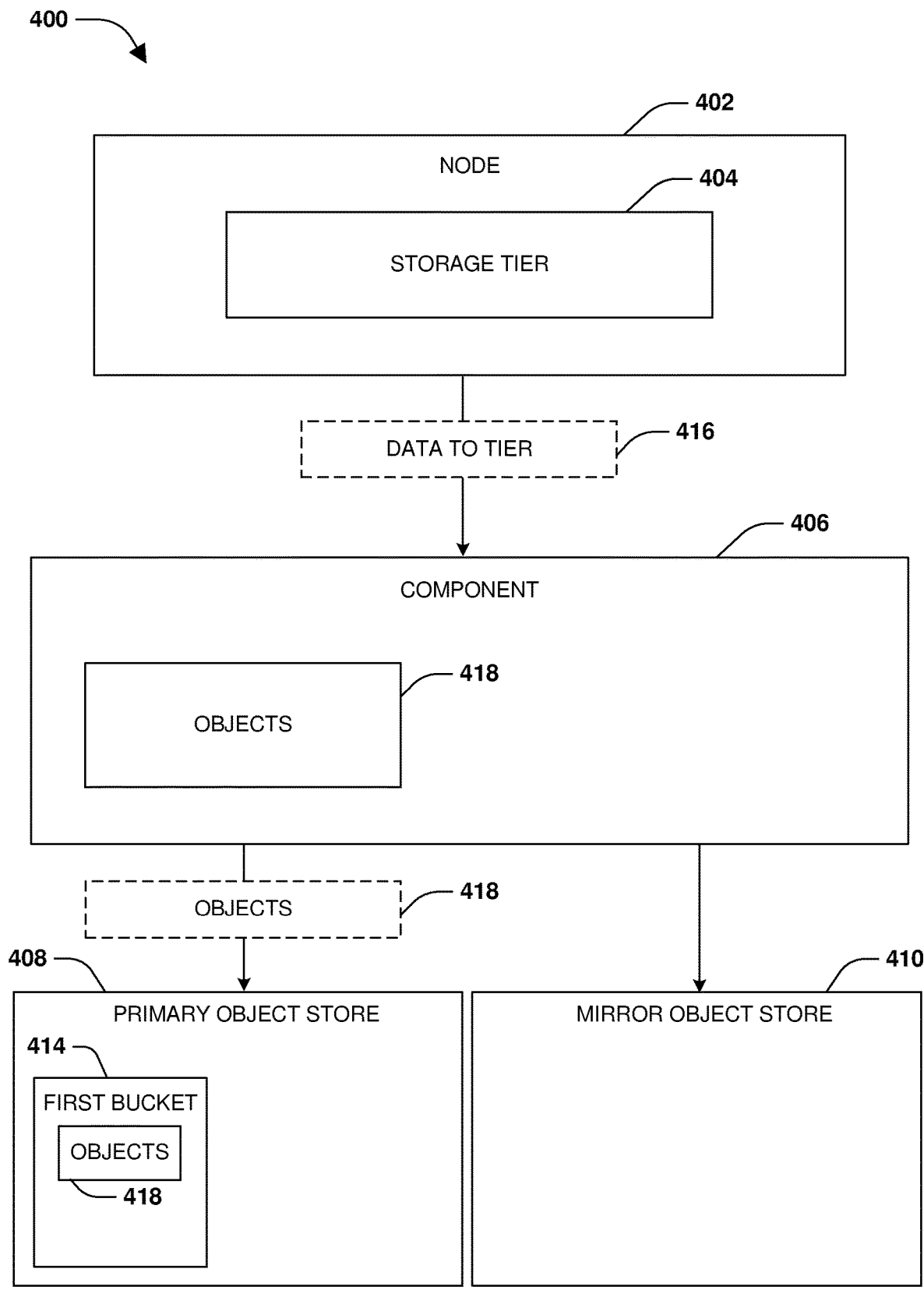
FIG. 4B is a component block diagram illustrating an example system for object store mirroring, where data is tiered from a storage tier to a primary object store.

The node 402 or the component 406 may identify data 416 to be tiered out from the storage tier 404 to the primary object store 408, as illustrated by FIG. 4B. The data 416 may be identified based upon a property of the data 416, such as a timestamp indicating that the data 416 has not been access within a threshold timespan or another property indicating that the data 416 is infrequently accessed. As a threshold amount of data 416 is identified for tiering, an object may be created to comprise the data 416. The object may comprise a number of slots, such as 1024 or any other number of slots, into which a certain amount of the data 416 can be stored (e.g., each slot may comprise up to 4 kb of data or any other designated size). Once enough data 416 is identified for tiering to fill an object, then the object may be created to comprise the data 416 within the slots. The object may comprise a header with various information used to access the data 416 within the slots. The object may be assigned a unique sequence identifier, and may be assigned a name that may be based upon the primary object store 408. In this way, the component 406 creates objects 418 of the data 416 and stores those objects 418 within the first storage bucket 414 of the primary object store 408.

Figure 4C:
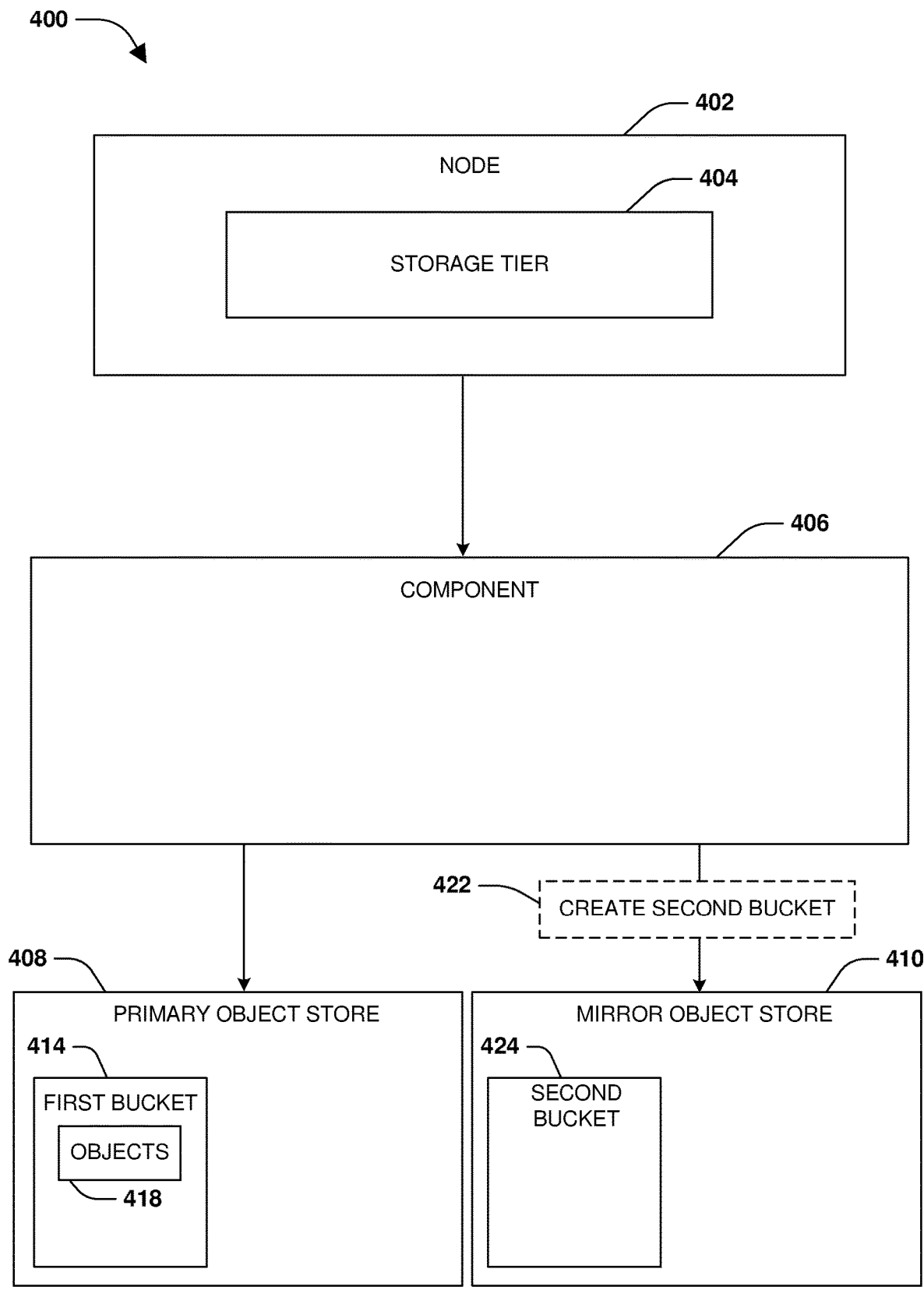
FIG. 4C is a component block diagram illustrating an example system for object store mirroring, where a second storage bucket is attached to a component.

In order to improve redundancy and availability, the component 406 may create 422 a second storage bucket 424 within a mirror object store 410, as illustrated by FIG. 4C. In an example, the primary object store 408 may be hosted by a first provider and the mirror object store 410 may be hosted by a second different provider. Thus, a failure, connectivity issue, or other issue of the primary object store 408 may not affect the mirror object store 410. In this way, the component 406 may store objects within the second storage bucket 424 that mirror the objects 418 within the first storage bucket 414 so that a failover operation can be performed to redirect access operations from the primary object store 408 to the mirror object store 410 in the event the primary object store 408 and/or one or more objects stored therein are unavailable.

Figure 4D:
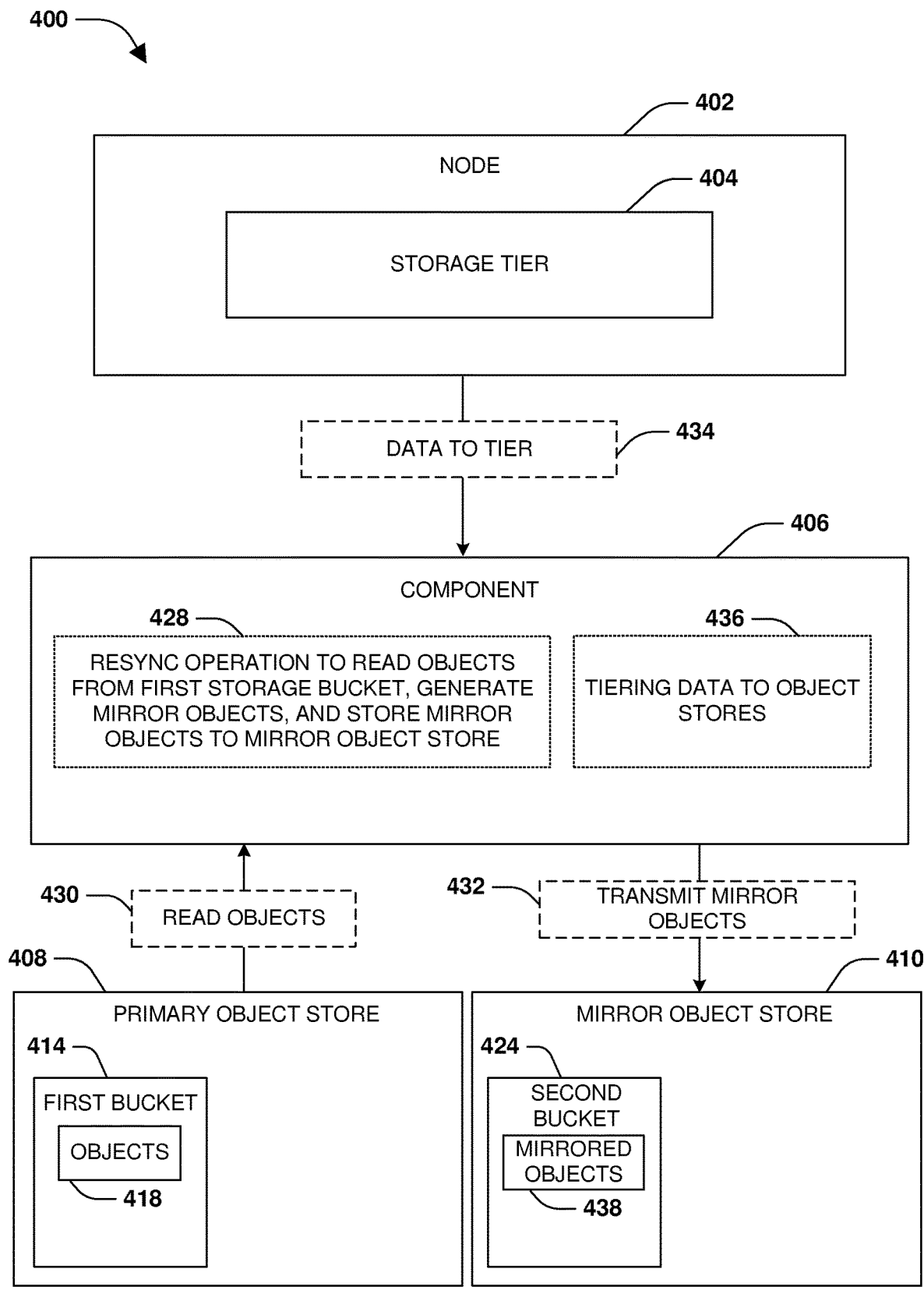
FIG. 4D is a component block diagram illustrating an example system for object store mirroring, where a second storage bucket is resynced using a first storage bucket.

Initially, the second storage bucket 424 does not comprise objects. Accordingly, the component 406 performs a resync operation 428 in order to populate the second storage bucket 424 with objects, such as mirrored objects 438 corresponding to the objects 418 within the first storage bucket 414, as illustrated by FIG. 4D. As part of the resync operation 428, the component 406 reads 430 the objects 418 from the first storage bucket 414. In an example, the objects 418 may be sequentially read from objects having a smallest object identifier to objects having a largest object identifier or any other type of ordering. Objects that have a reference count of zero (e.g., objects no longer being referenced by a file system of the node 402, and thus can be deleted by a garbage collection process) and objects having a creating state (e.g., objects that not have yet been verified as being successfully stored with valid data) may be skipped by the resync operation 428.

As part of the resync operation 428, the component 406 may read an object from the first storage bucket 414. The component 406 may create a mirrored object to comprise the data within the object. The mirrored object may be assigned a different name than the object, such as a name derived from the mirror object store 410. When creating the mirrored object, the data within the object may be encrypted. To improve the efficiency of the resync operation 428, the data is maintained in the encrypted state when stored within the mirrored object so that no decryption and re-encryption is necessary. In the event the resync operation 428 stops or is interrupted (e.g., client access to objects has a higher priority than the resync operation 428, and thus the resync operation 428 may be suspended at times so that the resync operation 428 does not increase latency of clients accessing objects within the primary object store 408), checkpoints are created. A checkpoint indicates which object of the first storage bucket 414 was last used to successfully create a mirrored object that was successfully stored and verified as having valid data within the mirror object store 410. The checkpoint can thus be used by the component 406 to resume the resync operation 428 where it was left off. In this way, the component 406 executes the resync operation 428 to create mirrored objects 438 that are transmitted 432 to the mirror object store 410 for storage within the second storage bucket 424. During the resync operation 428, the component 406 may continue to tier 436 data 434 from the storage tier 404 into objects for storage within the first storage bucket 414 and the second storage bucket 424.

Figure 4E:
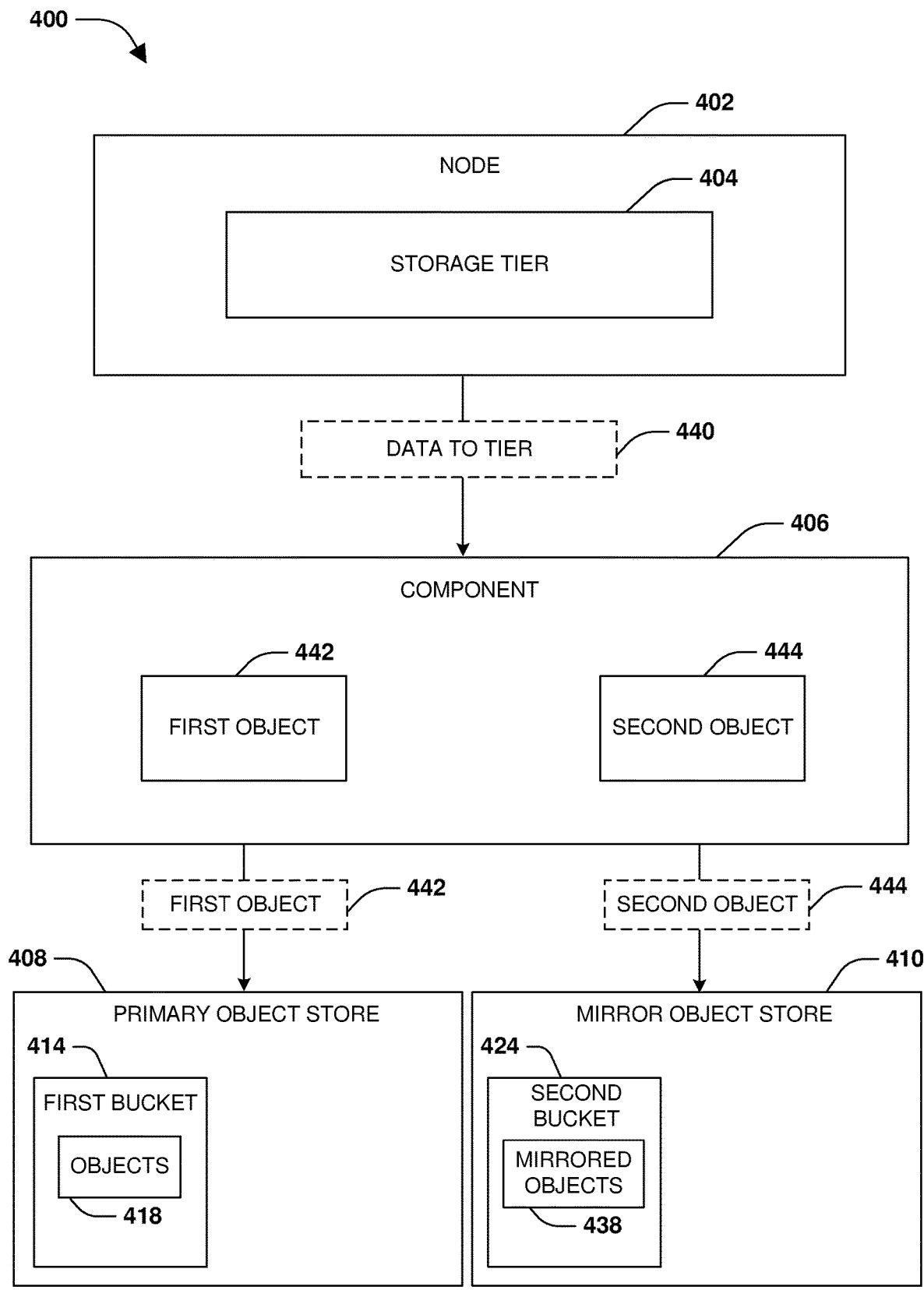
FIG. 4E is a component block diagram illustrating an example system for object store mirroring, where data is tiered to a primary object store and a mirror object store.

FIG. 4E illustrates an example of tiering data 440 to both the primary object store 408 and the mirror object store 410. The data 440 within the storage tier 404 may be determined to be set for being tiered out based upon a property of the data, at 302. For example, the data 440 may be identified as infrequently accessed data 440, and thus is set for being tiered out from the storage tier 404 to the primary object store 408 and the mirror object store 410. At 304, the component 406 creates a first object 442 and stores the data 440 into the slots of the first object 442. The first object 442 may be assigned a first name derived from the primary object store 408. At 306, the component 406 creates a second object 444 and stores the data 440 into slots of the second object 444. In this way, the first object 442 and the second object 444 comprise the same data 440. The second object 444 may be assigned a second name derived from the mirror object store 410. The component 406 may assign a creating state to the first object 442 and the second object 444 to indicate that the objects have not yet been successfully tiered out with valid data.

At 308, the first object 442 is transmitted to the primary object store 408 for storage within the first storage bucket 414 in parallel with the second object 444 being transmitted to the mirror object store 410 for storage within the second storage bucket 424. The component 406 may wait for the primary object store 408 to send a first acknowledgement that the first object 442 was successfully stored and for the mirror object store 410 to send a second acknowledgement that the second object 444 was successfully stored. In one example, upon receiving both the first acknowledgement and the second acknowledgement, the component 406 may designate the data 440 as being successfully tiered out, at 310. In another example, the component 406 performs an additional check before designating the data 440 as being successfully tiered out. For example, the component 406 may read a first header of the first object 442 within the first storage bucket 414 to verify that the first object 442 comprises the actual data 440 (valid data). The component 406 may read a second header of the second object 444 within the second storage bucket 424 to verify that the second object 444 comprises the actual data 440 (valid data). Once the component 406 has verified that both the first object 442 and the second object 444 comprise the actual data 440 (valid data), then the component 406 may designate the data 440 as being successfully tiered out. Once the data 440 has been designated as being successfully tiered out, a state of the first object 442 and the second object 444 may be modified from the creating state to a valid state indicating that the first object 442 and the second object 444 are valid.

If either the first acknowledgement or the second acknowledgement are not received by the component 406 or either the first object 442 and the second object 444 do not comprise valid/expected data 440 after being stored to the object stores, the tiering out of the data 440 is designated as being unsuccessful. That is, the tiering out is only successfully if both objects are successfully stored with valid/expected data 440 within both object stores. If the tiering out is unsuccessful, then the tiering out may be retried by retransmitting the first object 442 to the primary object store 408 for storage within the first storage bucket 414 (irrespective of whether the first object 442 was successfully stored with valid data during the first attempt) in parallel with the second object 444 being retransmitted with the mirror object store 410 for storage within the second storage bucket 424 (irrespective of whether the second object 444 was successfully stored with valid data during the first attempt). In this way, the first object 442 is stored among the objects 418 within the first storage bucket 414 and the second object 444 is stored amongst the mirrored objects 438 within the second storage bucket 424.

Figure 4F:
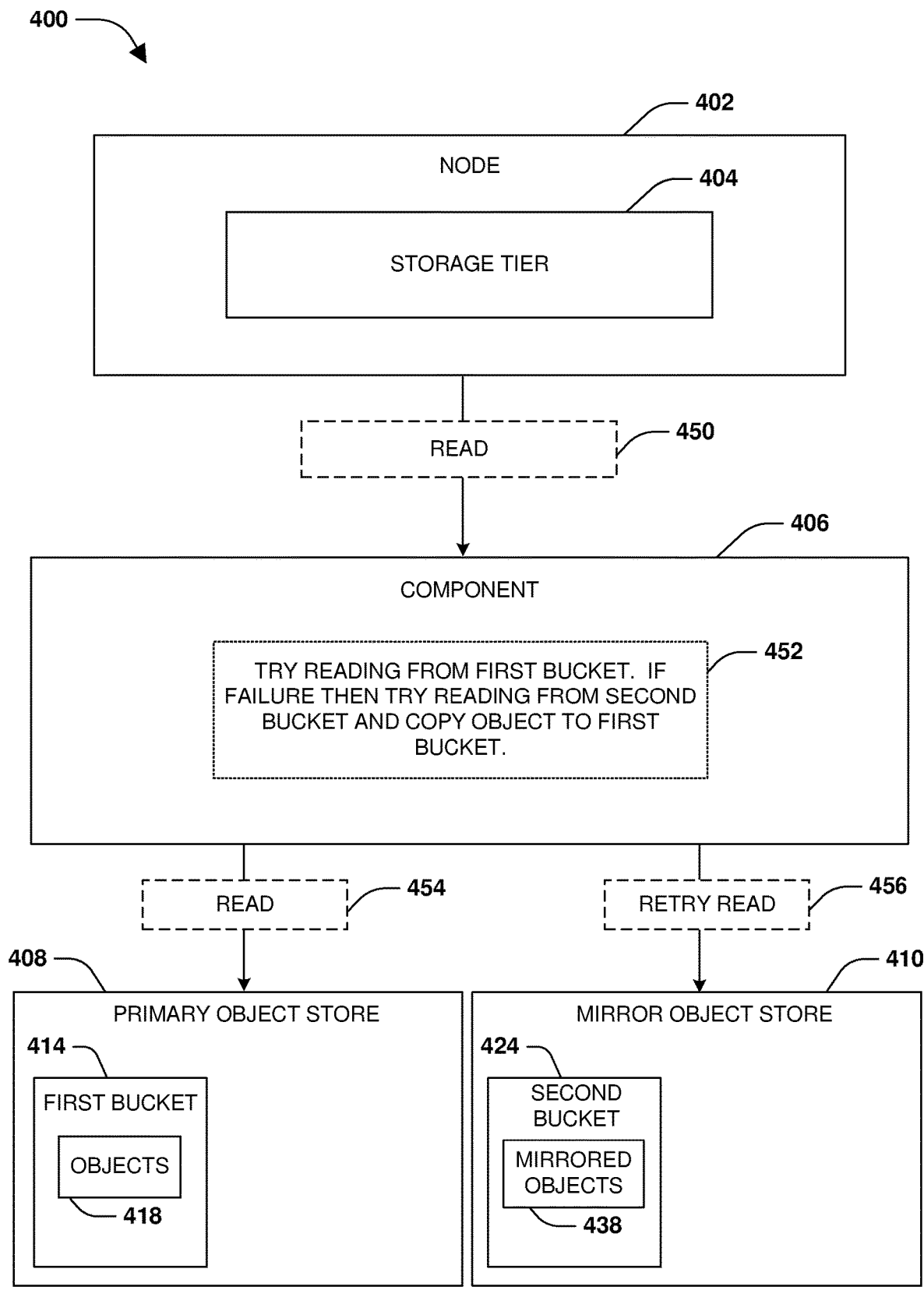
FIG. 4F is a component block diagram illustrating an example system for object store mirroring, where data is read from objects within object stores.

FIG. 4F illustrates the component 406 facilitating 452 a read operation 450 to access data within the first object 442 of the first storage bucket 414 within the primary object store 408. Upon receiving the read operation 450, the component 406 transmits a read request 454 to the primary object store 408 for the first object 442 comprising the requested data. If the first object 442 is received from the primary object store 408, then the request data of the first object 442 is returned to the node 402. However, if the read request 454 fails (e.g., fails a threshold number of times), the component 406 may retry the read request 454 as a retry read request 456 that is transmitted to the mirror object store 410 to read the second object 444 comprising the same requested data as the first object 442. If the second object 444 is received from the mirror object store 410, then the request data of the second object 444 is returned to the node 402. If the failed read request 454 indicated that the first object 442 was not found, then the data of the second object 444 may be used to create a new first object that is transmitted to the primary object store 408 for storage within the first storage bucket 414 in place of the lost first object 442.

Figure 4G:
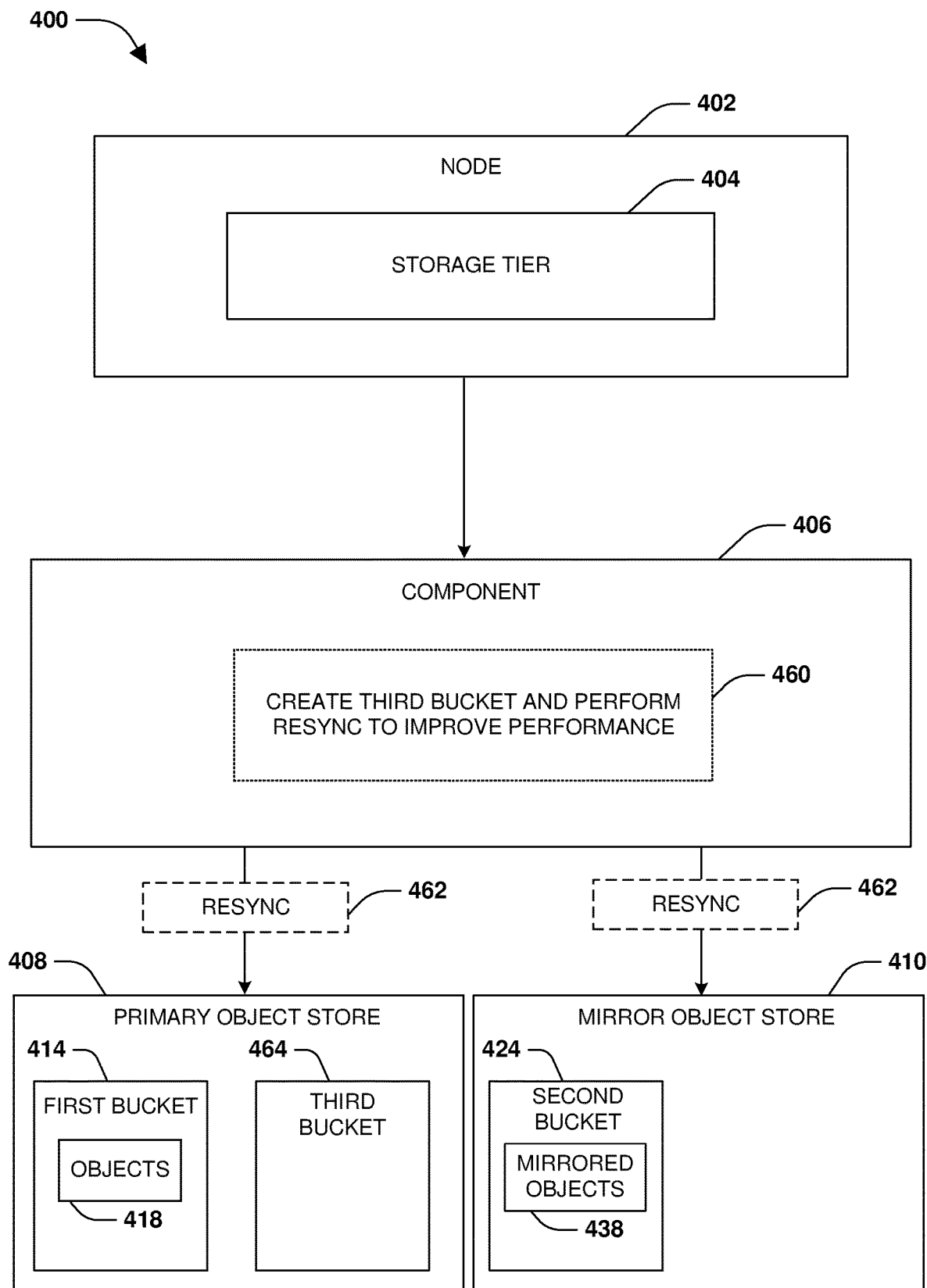
FIG. 4G is a component block diagram illustrating an example system for object store mirroring, where a third storage bucket is created and resynced.

FIG. 4G illustrates the component 406 creating 460 a third storage bucket 464 within the primary object store 408. For example, the component 406 may determine that performance (e.g., latency of processing read and write operations to the primary object store 408) is below a threshold.

Degraded performance may be due to the primary object store 408 limiting the number of operations to the first storage bucket 414 over a period of time. Accordingly, the component 406 creates 460 the third storage bucket 464 within the primary object store 408. The third storage bucket 464 may initially be empty of objects. In an example, once the third storage bucket 464 is created, new data to tier to the primary object store 408 may be stored as objects within the third bucket 464 as opposed to the first storage bucket 414. In another example, the component 406 may perform a resync operation 462 to read a subset of objects within the first storage bucket 414. Data within the subset of objects may be used to create a set of objects mirroring the subset of objects. The subset of objects are stored into the third storage bucket 464. The subset of objects may be removed from the first storage bucket 414. In this way, the objects 418 of the first storage bucket 414 may be spread amongst the first storage bucket 414 and the third storage bucket 464 to improve performance. In another example, all objects of the first storage bucket 414 may be copied to the third storage bucket 464. Then, read operations can be sent to either the first storage bucket 414 or the third storage bucket 464, such as in a round robin manner or other load balancing fashion in order to distribute the read operations amongst the buckets (e.g., roughly cutting read operations to each bucket in half).

In another example, the third storage bucket 464 may be created based upon a parameter of the first storage bucket 414 being incorrect, such as where the first storage bucket 414 was incorrectly named when created. Accordingly, the resync operation 462 can be performed to read the objects 418 from the first storage bucket 414, create new objects mirroring the objects 418, store the new objects within the third storage bucket 464, and detach and delete the first storage bucket 414.

Figure 4H:
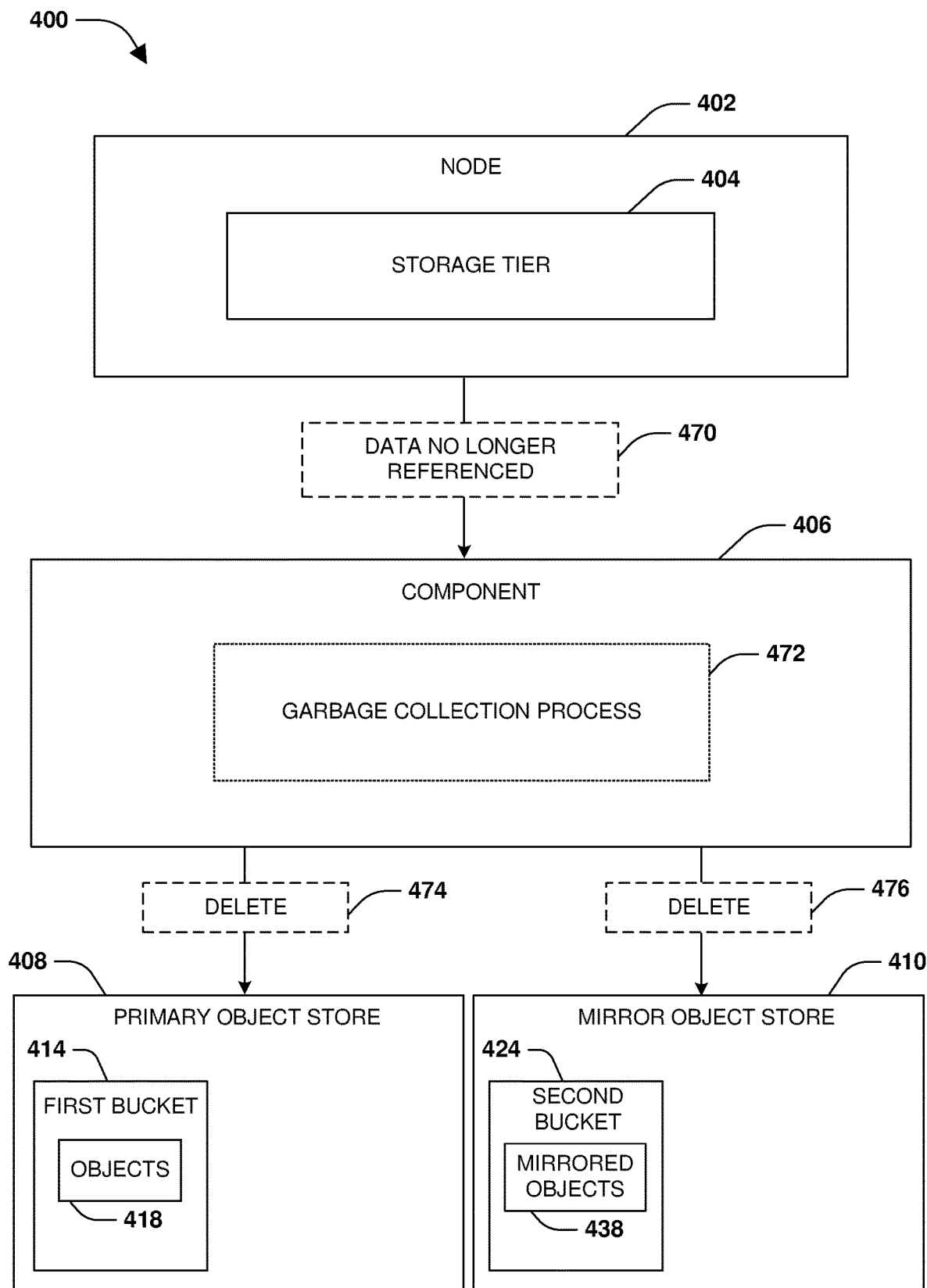
FIG. 4H is a component block diagram illustrating an example system for object store mirroring, where a garbage collection process is performed.

FIG. 4H illustrates the component 406 performing a garbage collection process 472. A file system of the node 402 may be evaluated to identify data 470 no longer being referenced by the file system, such as due to being deleted. An object within an object store may comprise the data 470 that is no longer referenced by the file system. In an example, the object may not be deleted immediately because the object may also comprise other data still referenced by the file system. Accordingly, the garbage collection process 472 can determine whether all data within an object is no longer referenced by the file system. In an example, the garbage collection process 472 may determine that all data within the first object 442 of the primary object store 408 and mirrored within the second object 444 of the mirror object store 410 is no longer referenced. The garbage collection process 472 transmits a first delete operation 474 to the primary object store 408 to delete the first object 442 from the first storage bucket 414 in parallel with transmitting a second delete operation 476 to the mirror object store 410 to delete the second object 444 from the second storage bucket 424. In an example, the garbage collection process 472 may be performed during a resync operation that could cause one of the object to already be deleted or missing. Thus, the garbage collection process 472 may be deemed successful even if an acknowledgement is received back for only one of the delete operations.

Figure 4I:
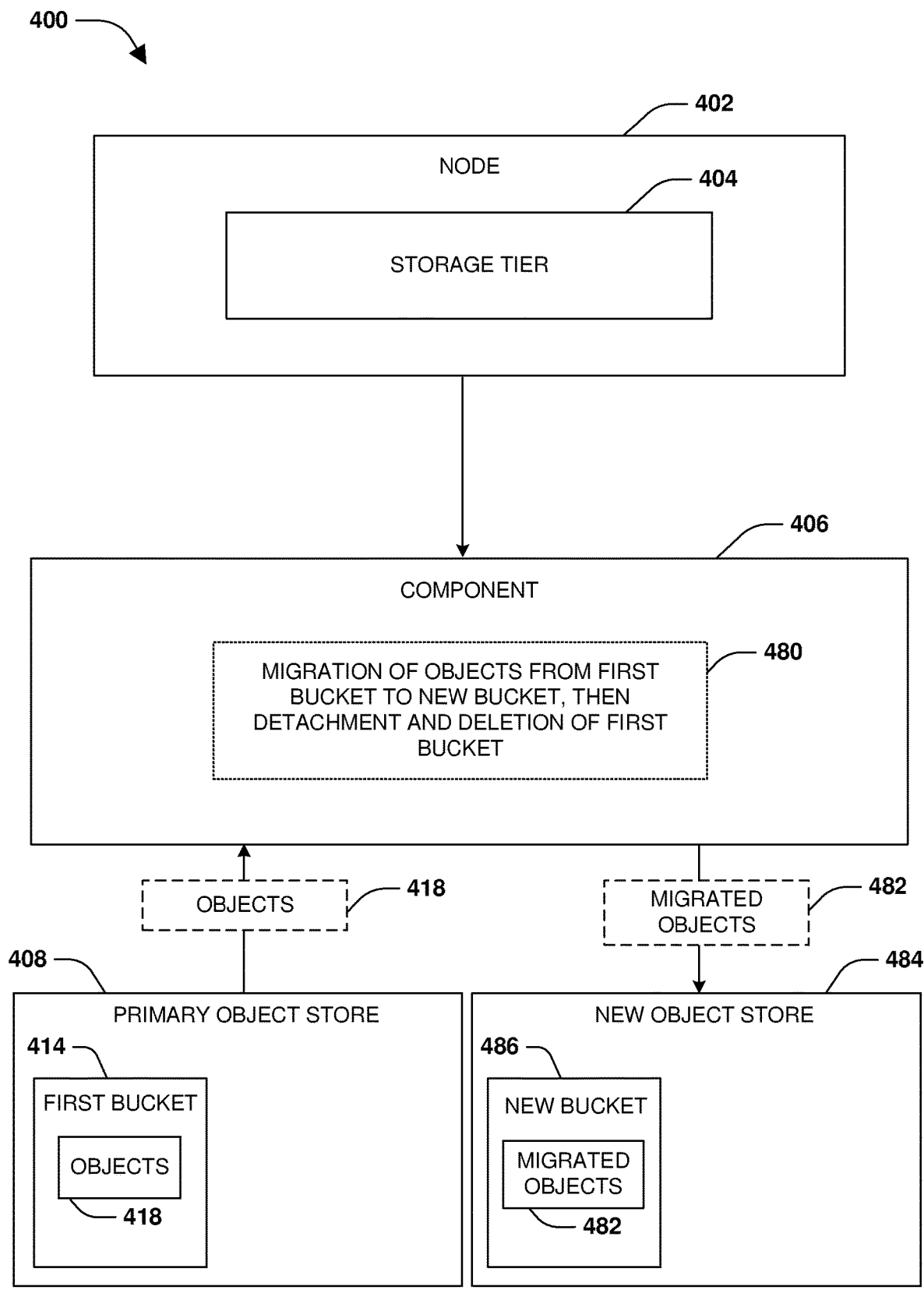
FIG. 4I is a component block diagram illustrating an example system for object store mirroring, where objects are migrated from a primary object store to a new object store.

FIG. 4I illustrates the component 406 facilitating a migration 480 from using the primary object store 408 to using a new object store 484 (e.g., an object store of a different provider than the provider of the primary object store 408). The component 406 accesses the new object store 484, and creates a new storage bucket 486 within the new object store 484. The component 406 retrieves the objects 418 within the first storage bucket 414 from the primary object store 408. The component 406 creates migrated objects 482 comprising the data within the objects 418, and stores the migrated objects 482 into the new storage bucket 486 of the new object store 484. In this way, read operations for data within the objects 418 and write operations to the objects 418 are redirected to the new object store 484. The objects 418 and/or the first storage bucket 414 are detached and deleted from the primary object store 408 once the migrated objects 482 are verified as being stored with valid data.

Figure 5:
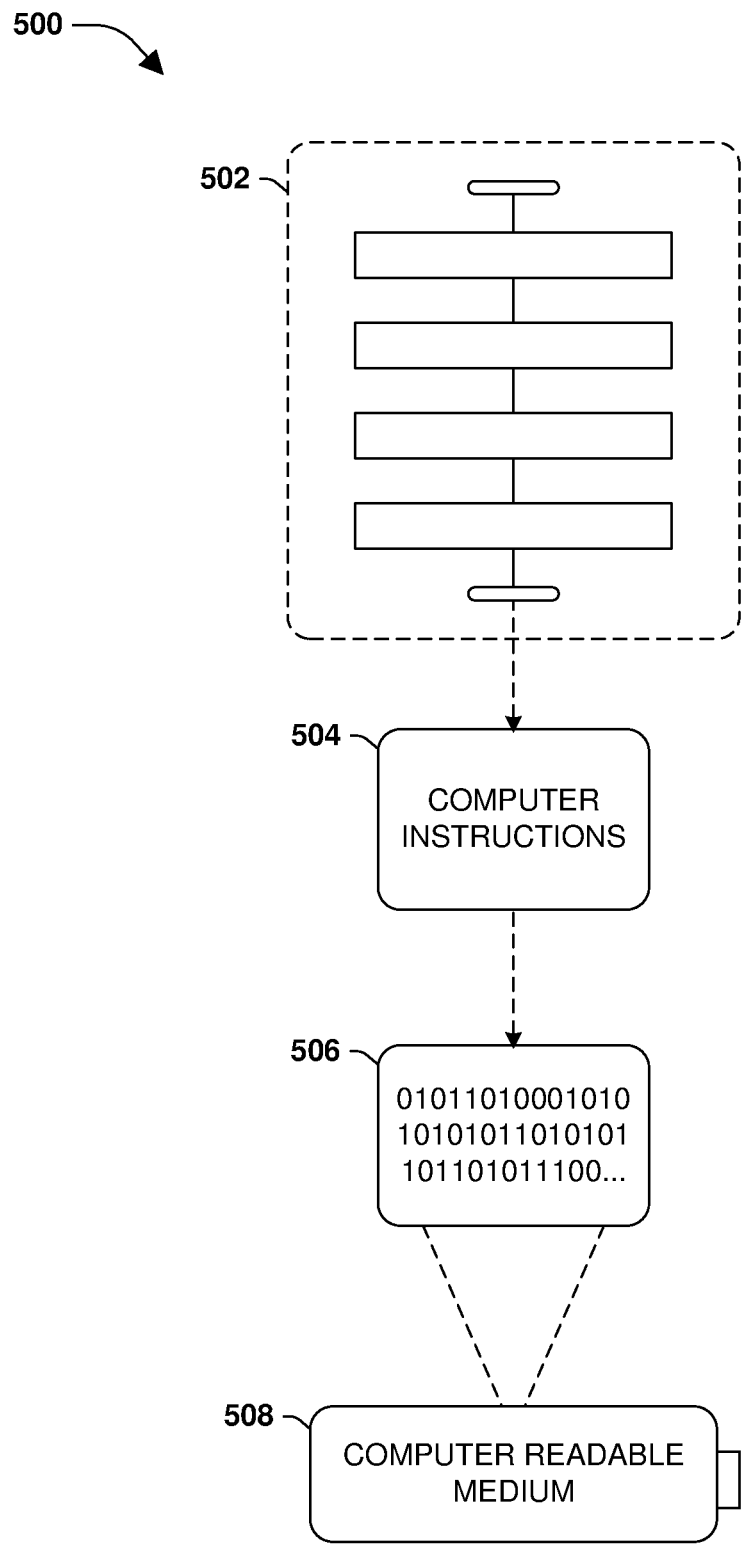
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4I, for example. Many such computer-readable media are contemplated to operate in accordance with the techniques presented herein.

Figure 6:
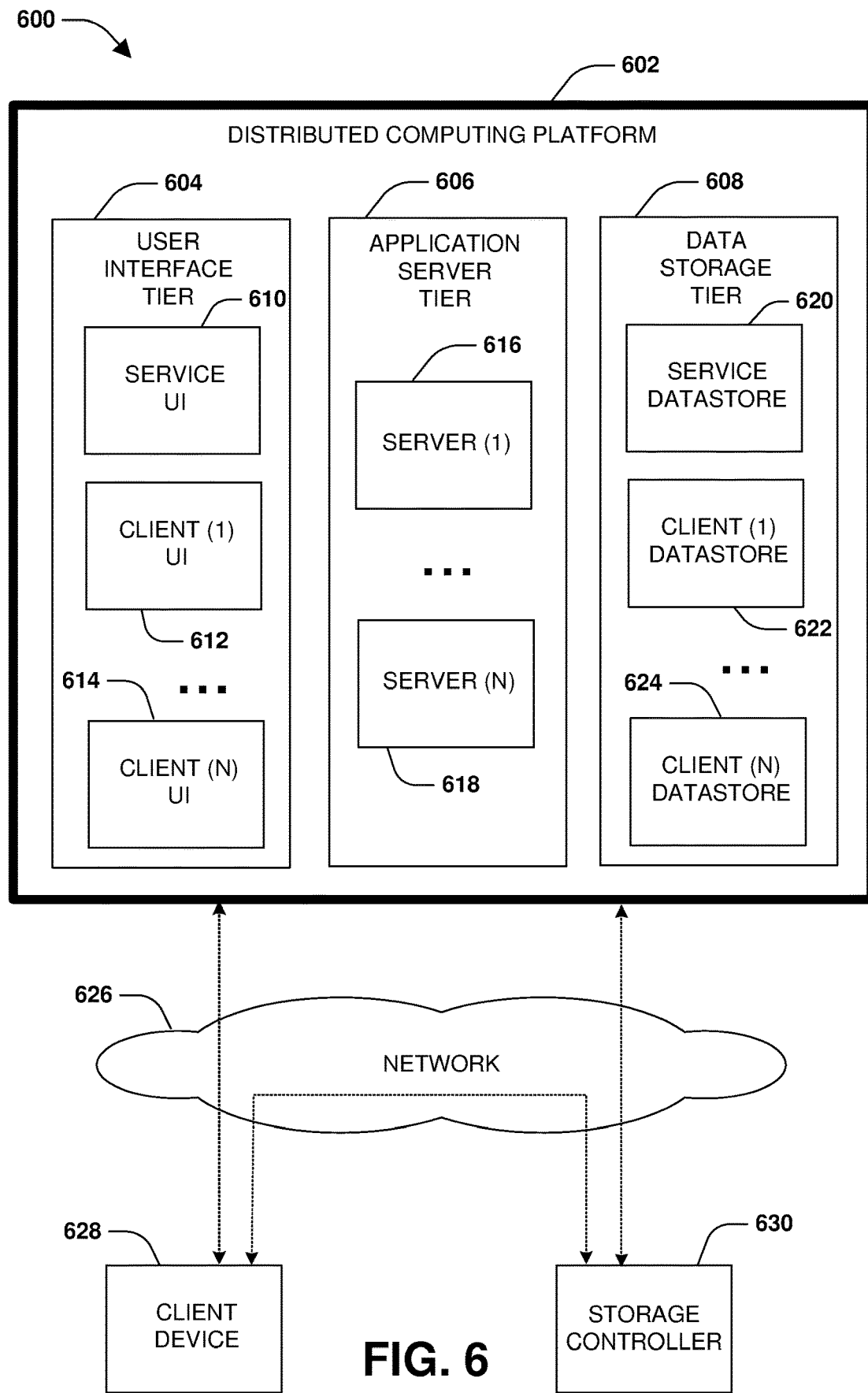
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
generating a first object and a second object to comprise data of a storage tier of a node based upon a property of the data;
transmitting, in parallel, the first object to a primary object store for storage within a first storage bucket and the second object to a mirror object store for storage within a second storage bucket;
performing a garbage collection process to transmit a first delete operation to the primary object store in parallel with a second delete operation to the mirror object store, wherein the first delete operation targets the first object within the primary object store;
and during the garbage collection process, performing a resync operation of the first storage bucket with the second storage bucket, wherein the first object is deleted within the first storage bucket.

2. The method of claim 1, wherein the garbage collection process is performed based upon a determination that the data of the storage tier, stored within the first object and the second object, is no longer referenced by a file system of the node.

3. The method of claim 1, wherein the second delete operation targets the second object within the mirror object store.

4. The method of claim 1, wherein the first storage bucket comprises a set of objects storing the data of the storage tier and the second storage bucket is initially created as a new empty storage bucket.

5. The method of claim 1, comprising:
determining that the garbage collection process is successful based upon the first delete operation and the second delete operation succeeding.

6. The method of claim 1, comprising:
determining that the garbage collection process is unsuccessful based upon the first delete operation succeeding and the second delete operation failing.

7. The method of claim 1, comprising:
determining that the garbage collection process is unsuccessful based upon the first delete operation failing and the second delete operation succeeding.

8. The method of claim 1, comprising:
skipping, by the resync operation, an object within the first storage bucket.

9. The method of claim 8, comprising:
skipping, by the resync operation, an object within the first storage bucket having a zero reference count.

10. The method of claim 8, comprising:
skipping, by the resync operation, an object within the first storage bucket having a creating state.

11. The method of claim 8, wherein the primary object store is hosted in a cloud computing environment.

12. The method of claim 1, comprising:
skipping, by the resync operation, objects within the first storage bucket having a zero reference count and objects within the first storage bucket having a creating state.

13. A non-transitory machine readable medium comprising instructions for performing a method, which when executed by a machine, causes the machine to:
generate a first object and a second object to comprise data of a storage tier of a node based upon a property of the data;
transmit, in parallel, the first object to a primary object store for storage within a first storage bucket and the second object to a mirror object store for storage within a second storage bucket;
perform a garbage collection process to transmit a first delete operation to the primary object store in parallel with a second delete operation to the mirror object store, wherein the first delete operation targets the first object within the primary object store;
and during the garbage collection process, performing a resync operation of the first storage bucket with the second storage bucket, wherein the first object is deleted within the first storage bucket.

14. The non-transitory machine readable medium of claim 13, comprising:
skipping, by the resync operation, an object within the first storage bucket.

15. The non-transitory machine readable medium of claim 13, wherein the second delete operation targets the second object within the mirror object store.

16. The non-transitory machine readable medium of claim 13, wherein the garbage collection process is performed based upon a determination that the data of the storage tier, stored within the first object and the second object, is no longer referenced by a file system of the node.

17. A computing device comprising:
a memory comprising machine executable code;
and a processor coupled to the memory, the processor configured to execute the machine executable code to cause the computing device to:
generate a first object and a second object to comprise first data of a storage tier of a node based upon a property of the first data;
transmit, in parallel, the first object to a primary object store for storage within a first storage bucket and a second object to a mirror object store for storage within a second storage bucket;
perform a garbage collection process to transmit a first delete operation to the primary object store in parallel with a second delete operation to the mirror object store, wherein the first delete operation targets the first object within the primary object store;
and during the garbage collection process, performing a resync operation of the first storage bucket with the second storage bucket, wherein the first object is deleted within the first storage bucket.

18. The computing device of claim 17, wherein the second delete operation targets the second object within the mirror object store.

19. The computing device of claim 17, wherein the machine executable code causes the computing device to:
perform the garbage collection process based upon a determination that the data of the storage tier stored within the first object and the second object is no longer referenced by a file system of the node.

20. The computing device of claim 17 further comprising skipping, by the resync operation, an object within the first storage bucket having a zero reference count.

* * * * *